US008141114B2

(12) United States Patent
Conradt et al.

(10) Patent No.: US 8,141,114 B2
(45) Date of Patent: Mar. 20, 2012

(54) CONTENT RATINGS AND RECOMMENDATIONS

(75) Inventors: Jonathan L. Conradt, Redmond, WA (US); Shannon B. Vosseller, San Francisco, CA (US); John Bradstreet, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 11/276,457

(22) Filed: Feb. 28, 2006

(65) Prior Publication Data

US 2007/0204287 A1 Aug. 30, 2007

(51) Int. Cl.
*G06F 3/00* (2006.01)
*G06F 13/00* (2006.01)
*H04N 5/445* (2006.01)

(52) U.S. Cl. .......................................... 725/47; 725/44

(58) Field of Classification Search ................ 725/9, 13, 725/44, 47
See application file for complete search history.

(56) References Cited

U.S. PATENT DOCUMENTS

| 6,286,141 | B1 * | 9/2001 | Browne et al. ................. 725/39 |
| 2002/0174428 | A1 * | 11/2002 | Agnihotri et al. ............... 725/46 |
| 2002/0199188 | A1 * | 12/2002 | Sie et al. .......................... 725/35 |
| 2002/0199194 | A1 * | 12/2002 | Ali .................................. 725/46 |
| 2006/0242309 | A1 * | 10/2006 | Damick et al. ................ 709/229 |
| 2007/0179835 | A1 * | 8/2007 | Ott et al. ......................... 705/10 |

* cited by examiner

*Primary Examiner* — Ngoc Vu
(74) *Attorney, Agent, or Firm* — Lee & Hayes, PLLC

(57) ABSTRACT

Content ratings and recommendations is described. In an embodiment, a ratings service compiles ratings of programs for a rating system that is associated with a group of viewers, where a viewer of the group establishes the rating system, and where at least some of the viewers of the group rate the programs for the group of viewers. A recommendation service then provides program recommendations to the viewers of the group based on the rating system.

26 Claims, 7 Drawing Sheets

CONTENT RATINGS AND RECOMMENDATIONS

BACKGROUND

Television programs and movies are typically rated by broadcast and cable television networks according to the networks' standards and/or by the MPAA (Motion Picture Association of America). Other program and movie ratings, such as the various parental control ratings, are assigned by a board, committee, association, or other regulatory body. For example, the TV Parental Guidelines is a ratings system governed by a monitoring board and implemented with the V-Chip in an effort to provide parents guidance and programming information about the content and age-based appropriateness of television programs.

Oftentimes, the ratings provided as "community standards" by any number of the various rating groups do not reflect the values and viewing choices of the nearly infinite number of cultures, subcultures, and associations in our many societies. In effect, there is not one rating system that provides accepted programming and movie guidance for everyone, nor will one rating system always provide the basis for programming selection guidance for even one person.

SUMMARY

This summary is provided to introduce simplified concepts of content ratings and recommendations which is further described below in the Detailed Description. This summary is not intended to identify essential features of the claimed subject matter, nor is it intended for use in determining the scope of the claimed subject matter.

In an embodiment of content ratings and recommendations, a ratings service compiles ratings of programs for a rating system that is associated with a group of viewers, where a viewer of the group establishes the rating system, and where at least some of the viewers of the group rate the programs for the group of viewers. A recommendation service then provides program recommendations to the viewers of the group based on the rating system. For example, the recommendation service can provide a program recommendation to a viewer of the group via an email message, a mobile text message, and/or a program guide selection.

In other embodiments of content ratings and recommendations, the recommendation service can monitor viewing selections of a viewer that is not a member of the group, and offer a membership into the rating system to the viewer based on the selections of the viewer and standards of the rating system. Additionally, the recommendation service can initiate a recording of a recommended program with a television-based client device for a viewer of the group, or the recommendation service can prevent a program from being displayed for viewing if the program is rated not for viewing according to standards of the rating system.

BRIEF DESCRIPTION OF THE DRAWINGS

The same numbers are used throughout the drawings to reference like features and components.

DETAILED DESCRIPTION

Content ratings and recommendations is described in which embodiments provide that a viewer can create a rating system that other viewers can then subscribe to which forms a group, or subculture, that collaborates to identify and rate television programs, movies, and other programming choices for the viewers of the group. This adaptive and flexible approach enables individual viewers to discover like-minded subcultures, benefit from a rating system that represents similar viewing choices, and optionally, participate in identifying media content and rating the viewing choices.

Content ratings and recommendations provide that viewers can search, join, and create their own subcultures for rating content, and allows any viewer to combine ratings from different subcultures in various logical ways to create their own unique combined rating system. Members of a subculture, such as a group of viewers, can also comment on programming content via online discussion groups that are distinct for the subculture and the media content. Programming choices and viewing selections can then be recommended to the viewers of a group based on an established rating system, or a member of the group can search content based on the group recommendations and the standards of the rating system.

While aspects of the described systems and methods for content ratings and recommendations can be implemented in any number of different computing systems, environments, television-based entertainment systems, and/or configurations, embodiments of content ratings and recommendations are described in the context of the following exemplary system architecture(s).

Figure 1:
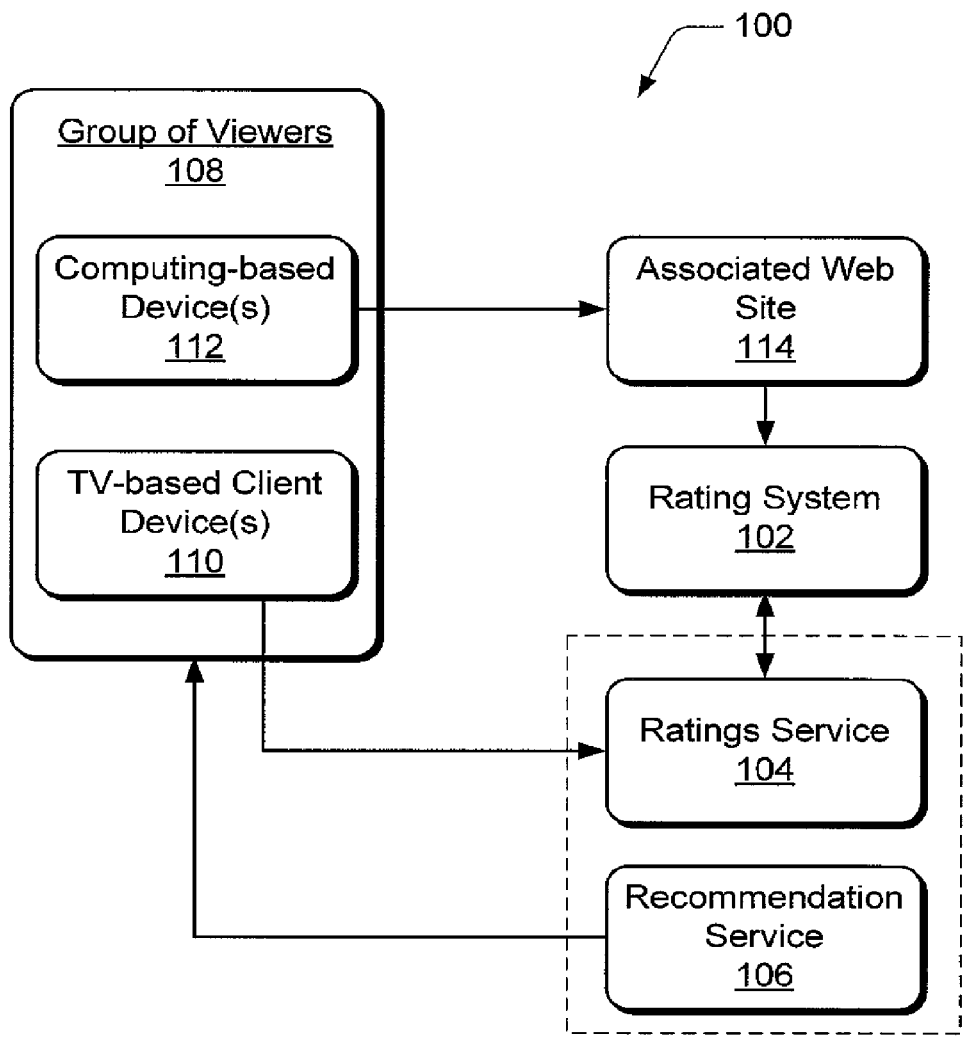
FIG. 1 illustrates an exemplary content ratings and recommendations system in which embodiments of content ratings and recommendations can be implemented.

FIG. 1 illustrates an exemplary content ratings and recommendations system 100 in which embodiments of content ratings and recommendations can be implemented. The system 100 includes a rating system 102, a ratings service 104, and a recommendation service 106. The rating system 102 is associated with a group of viewers 108 where one or several of the viewers of the group create the rating system 102 to discover like-minded individuals and members of a subculture that may have similar interests and programming preferences. As described herein, a "program" refers to any television program, movie, commercial, musical piece, on-demand and/or broadcast media content, and any similar audio, video, and/or image media content.

The content ratings and recommendations system 100 allows viewers or users to search, join, and create their own subcultures for rating content, and allows users to combine ratings from different subcultures in various logical ways to create their own unique combined rating system. Members of a subculture, such as the group of viewers 108, can also comment on programming content via online discussion groups that are distinct for the subculture and the media content.

The rating system 102 associated with the group of viewers 108 can represent any flexible characterization of the media content, and can be a mixed hierarchy of ratings that is integrated with a viewing experience to provide programming recommendations to the viewers of the group 108. The rating system 102 is not necessarily just a restrictive-based rating system, although the rating system 102 can be implemented to exclude programs and media content that is not acceptable to the group of viewers 108 for whatever reason. Additionally however, the rating system 102 can also be created as a descriptive rating system based on any descriptive aspects of programming selections, such as great cinematography, an acceptable level of morality, accurate portrayals of history, music scores, limited violence, and any other one or combination of the many descriptive possibilities. As such, the rating system 102 includes both programs that are rated for viewing and programs that are rated not for viewing according to standards of the rating system.

One or more of the viewers of the group 108 can establish the standards of the rating system 102. Additionally, the axis and meaning of the ratings used in the rating system 102, as well as the representations (or "icons") and descriptions of the ratings, can be defined by the viewers of the group. In addition, the rating system 102 can include any combination or features of additional rating systems. The group of viewers 108, or at least those that create and develop the rating system 102, can also establish factors for the reliability and credibility of program reviews that are incorporated as part of the rating system 102. Inter-rater monitoring can quantify the appropriateness of a viewer's ratings to the subculture of the viewer group, and provides a reliability or credibility rating for the viewer.

A viewer can choose to be a member of the group 108 to identify (or "tag") content and contribute to the rating system 102. The group of viewers 108 can be any collective group of individuals that participate to rate and identify programming choices that are relevant to others having similar viewing interests. For example, a group of scientists may rate how accurately various programs having a scientific theme accurately portray scientific ideas. Similarly, a group of train enthusiasts may rate programs based on how often trains appear in the programs, and descriptively, what types of trains. A subculture can label and assess how media content fits into its norms to thus create a more distinct and valuable boundary. The scale of the rating system 102 is not restricted, and can be labeled with any type of identifiers that are relevant to the viewers of the group 108 to identify programs for viewing. Other groups of viewers may include a parent-teacher association, a religious-based community, or any other subculture wanting to provide standards and boundaries for program viewing selections.

Generally, each viewer of the group 108 has a television-based client device 110 that receives the programs as any form of on-demand and/or broadcast media content. Each viewer of the group 108 may also have one or more computing-based devices 112, to include a television-based client device, a portable device such as a cell phone and/or combination PDA (personal digital assistant), and/or a desktop or portable computer. A television-based client device 110 can be implemented with any number and combination of differing components as described with reference to the television-based client device 202 shown in FIG. 2, and with reference to the exemplary client device 700 shown in FIG. 7.

Viewers of the group 108 can access and provide input to the rating system 102 via an associated Web site 114 such that at least some of the viewers of the group cooperate to rate programs for all of the members of the group. In one implementation, the associated Web site 114 can be accessed via the Internet from a Web browser implemented in a computing-based device 112 and/or a television-based client device 110.

The ratings service 104 compiles ratings of programs for the rating system 102 that is associated with the group of viewers 108. The ratings service 104 can also combine the rating system 102 with additional rating system(s) to create a combined rating system that may be unique to a viewer of the group 108. The ratings service 104 can also compile additional ratings of the programs from additional rating system(s) such that the rating system includes the combined program ratings.

The ratings service 104 can also be implemented to compile viewing selections of at least some of the viewers of the group 108 and update the rating system 102 to include the ratings of the programs and the viewing selections that comport with the standards of the rating system 102. The ratings service 104 can also receive a rating of a program from a viewer of the group 108 via a television-based client device 110 while the viewer is watching the program.

The recommendation service 106 provides programming recommendations to the viewers of the group 108 based on standards of the rating system 102. The recommendation service 106 can provide a program recommendation to a viewer of the group 108 via an email message, a mobile text message, and/or as a program guide selection. For example, a viewer may receive an email or text message on a computing-based device 112 and/or a program guide selection displayed on the display device associated with a television-based client device 110.

The recommendation service 106 can also be implemented to monitor viewing selections of a viewer that is not a member of the group 108, and offer a membership into the rating system to the viewer based on the viewing selections and standards of the rating system. Additionally, the recommendation service 106 can initiate a recording of a recommended program with a television-based client device 110 for a viewer of the group 108.

The recommendation service 106 can also be implemented to prevent a program from being displayed for viewing if the program is rated not for viewing according to standards of the rating system 102. For example, with the advent of DVDs, DVRs (digital video recorders), and video on-demand, kids have access to many more program and viewing options than their parents may approve of. As such, the recommendation service 106 can evaluate a program or movie that is started for viewing and determine whether the program or movie is rated not for viewing by the rating system 102. If the program or movie is rated not for viewing, the recommendation service 106 can stop the program or movie from being displayed.

Figure 2:
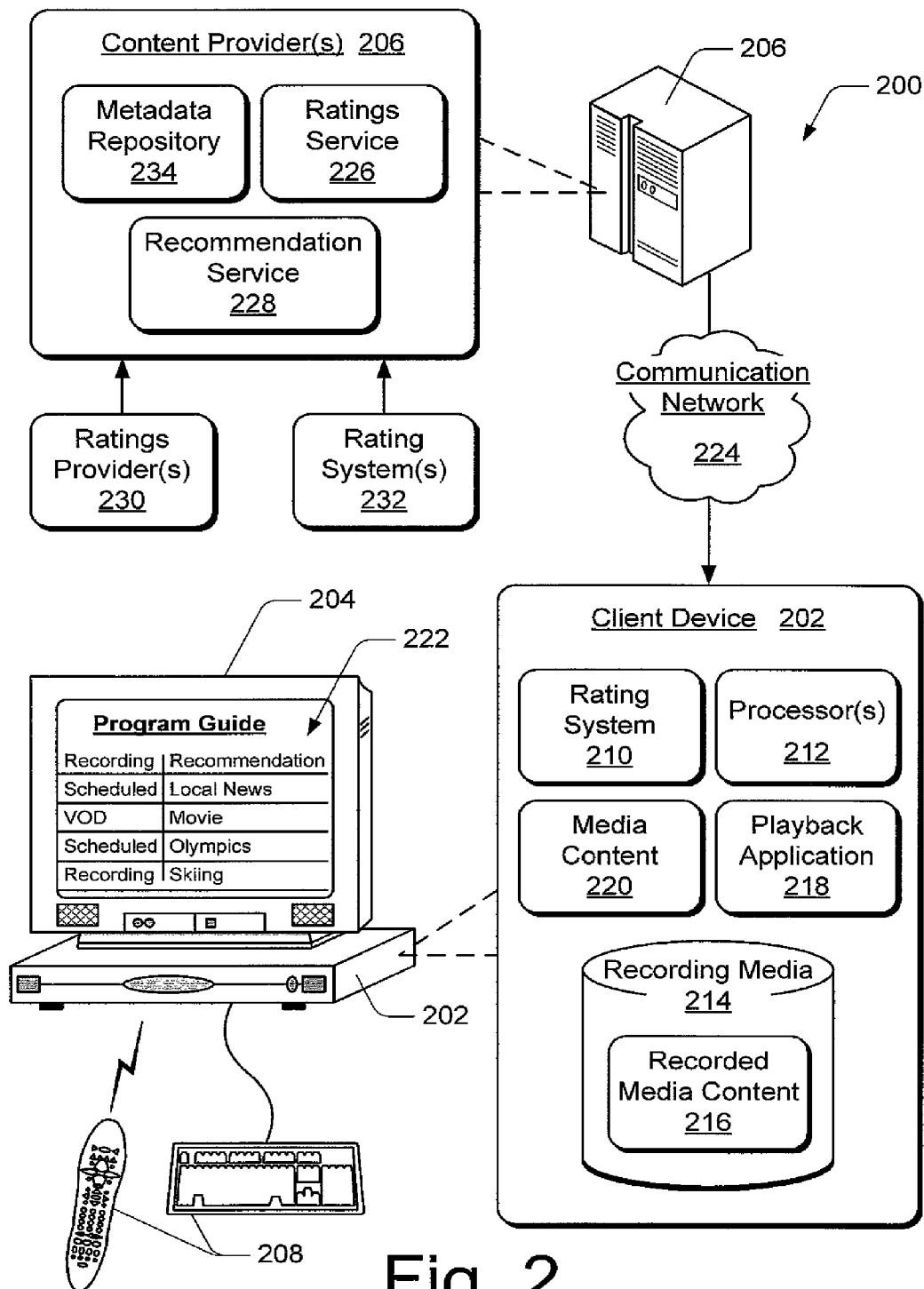
FIG. 2 illustrates an exemplary television-based system in which embodiments of content ratings and recommendations can be implemented.

FIG. 2 illustrates an exemplary television-based system 200 in which embodiments of content ratings and recommendations can be implemented. The system 200 includes a television-based client device 202, a display device 204, content provider(s) 206, and input devices 208, such as a remote control device and a computer keyboard. The display device 202 can be any type of television, LCD, or similar television-based display system that renders audio, video, and/or image data. The client device 102 and display device 104 together are but one example of a television-based client system, examples of which are described with reference to the exemplary IP-based television (IPTV) system 500 shown in FIG. 5, and with reference to the exemplary entertainment and information system 700 shown in FIG. 7.

Client device 202 can be implemented in any number of embodiments, such as a set-top box, a digital video recorder (DVR) and playback system, an appliance device, a gaming device, and as any other type of client device that may be implemented in a television-based entertainment and information system. In this example, client device 202 includes a rating system 210 that is associated with the viewer at client device 202. The client device 202 also includes one or more processor(s) 212, recording media 214 that maintains recorded media content 216, and a playback application 218 which can be implemented as computer executable instructions and executed by the processor(s) 212 to implement embodiments of content ratings and recommendations. Additionally, client device 202 may be implemented with any number and combination of differing components as further described below with reference to the exemplary client device 600 shown in FIG. 6.

Recording media 214 along with the playback application 218 can be implemented as a DVR system to record and maintain the recorded media content 216 which may be any form of on-demand and/or broadcast media content 220 such as programs, movies, commercials, music, and similar audio, video, and/or image content that client device 202 receives and/or records. Further, client device 202 may access or receive additional recorded media content that is maintained with a remote data store (not shown), such as from a video-on-demand server, or media content that is maintained at a broadcast center or content provider that distributes the media content to subscriber sites and client devices.

The playback application 218 is a video control application that, in this example, can be implemented to control the playback of media content 220, the recorded media content 216, and or other video on-demand media content, music, and any other audio, video, and/or image media content which can be rendered and/or displayed for viewing on display device 204, such as a program guide 222. In this example, the program guide 222 includes a recording recommendation for a viewer that utilizes the television-based client device 202.

The television-based client device 202 is configured for communication with the content provider(s) 206 via a communication network 224, which in this example, is an IP-based network. The client device 202 receives programs, associated program content, various forms of media content, program guide data, advertising content, and other media content from content server(s) of the content provider(s) 206 via the IP-based network 224.

The content provider 206 includes a ratings service 226 and a recommendation service 228 to implement embodiments of content ratings and recommendations as described with reference to the exemplary content ratings and recommendations system 100, ratings service 104, and recommendation service 106 shown in FIG. 1. Although the ratings service 226 and the recommendation service 228 are each illustrated and described as single application programs, each of the ratings service 226 and recommendation service 228 can be implemented as several component applications distributed to each perform one or more functions in a content ratings and recommendations system. Further, although the ratings service 226 and the recommendation service 228 are illustrated and described as separate application programs, the ratings service 226 and the recommendation service 228 can be implemented together as a single application program in the content provider 206 and/or in the client device 202 to implement embodiments of content ratings and recommendations.

The content provider 206 can receive additional ratings about programs from other ratings provider(s) 230, and the ratings service 226 can compile the additional ratings of the programs for the rating system 210. Additionally, the ratings service 226 can receive and combine other rating system(s) 232 with the rating system 210 to create a combined rating system. The content provider 206 can also include a metadata repository 234 that contains the listings and metadata information provided by the television and movie industry. The metadata information, as well as the official ratings and tags, can be supplemented with the ratings assigned by the viewers of a subculture group.

When a viewer adds a rating or tag to a piece of content, that rating is communicated along with a group identifier, and optionally a unique but anonymous identifier corresponding to the viewer, to the ratings service 226 which implements a metadata consolidation system. This system collects the metadata, aggregates it, and performs the inter-rater reliability measurements of the individual viewers. After a piece of content has received a set minimum number of rating submissions, the aggregated information is published from the metadata consolidation system to the metadata repository 234.

The content provider 206 can provide the program recommendations and/or program ratings to the viewers of the group by communicating the information to the television-based client device 202 either in-band along with a program or broadcast, out-of-band, or a combination of both. Alternatively, a program identifier can be communicated from the content provider 206 to the television-based client device 202 which the client device then utilizes to request the corresponding rating information from the content provider 206, or other similar data repository.

Methods for content ratings and recommendations, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
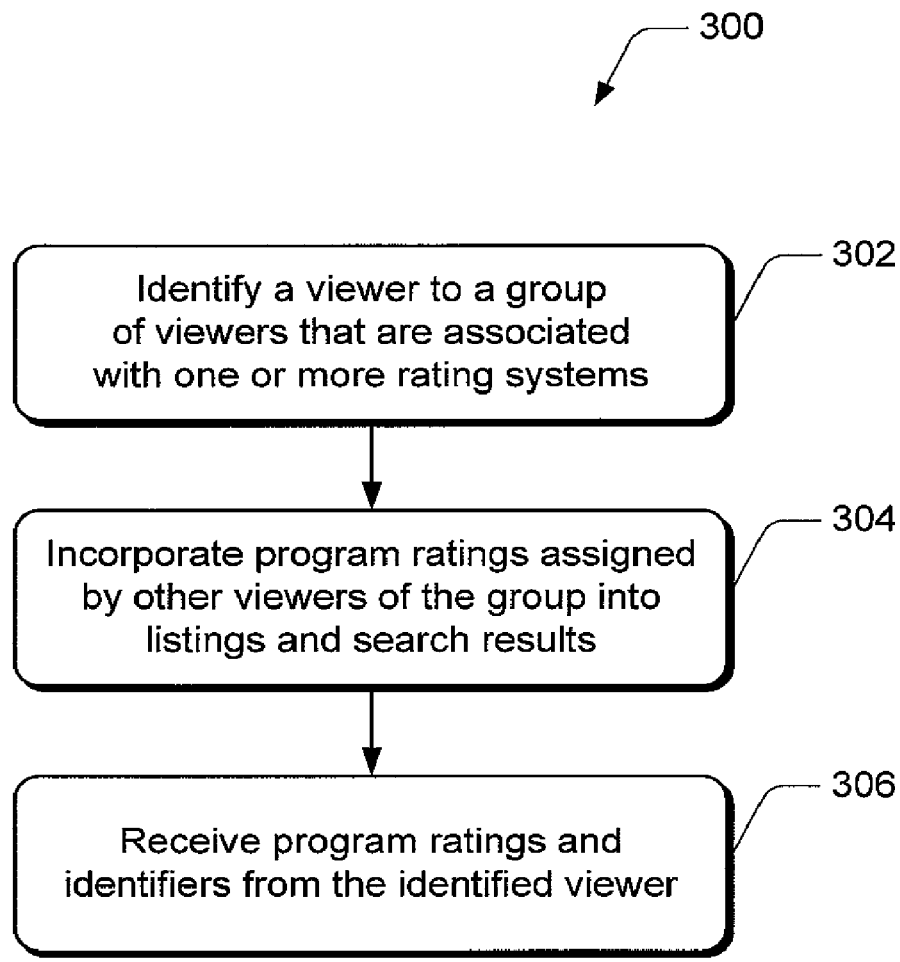
FIG. 3 illustrates exemplary method(s) for content ratings and recommendations.

FIG. 3 illustrates an exemplary method 300 for content ratings and recommendations and is described with reference to the exemplary content ratings and recommendations system 100 shown in FIG. 1, and with reference to the exemplary television-based system 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, a viewer is identified to a group of viewers that are associated with one or more rating systems. For example, the ratings and/or recommendation services 104, 106 can associate a viewer to the group of viewers 108. A viewer can locate a group by first searching for appropriate groups by any one or combination of group names, keywords, and/or descriptions associated with the groups that allow the viewer to find them either through a television-based client device 110, computing-based device 112, or a Web site 114. Alternatively, a group membership may be recommended to a viewer based on the viewer's programming and viewing selections. The viewer can then opt to be added to a group membership in a similar manner as if having searched to locate the group.

At block 304, program ratings assigned by other viewers of the group are incorporated into listings and search results. For example, a viewer associated with a group 108 can choose to incorporate the program ratings assigned by other group members into their listings and search results when interacting with an electronic program guide 222 at a television-based client device 202, or at the associated Web site 114. The viewer associated with the group 108 can also search for program and viewing recommendations based on the ratings and tags of the group to find available video-on-demand, broadcast, or online content.

At block 306, program ratings and identifiers are received from the identified viewer. For example, the viewer can actively provide program ratings and information back into the subculture (e.g., to the ratings service 104) by rating and tagging the media content 220 that they know about or have viewed. The viewer can provide a program rating while viewing a program, or can submit several ratings via the associated Web site 114. The ratings and tags can also be applied by the viewer in a batch when reviewing lists of content on their television-based client device 110, computing-based device 112, or via the associated Web site 114 during or immediately after viewing a program.

Figure 4:
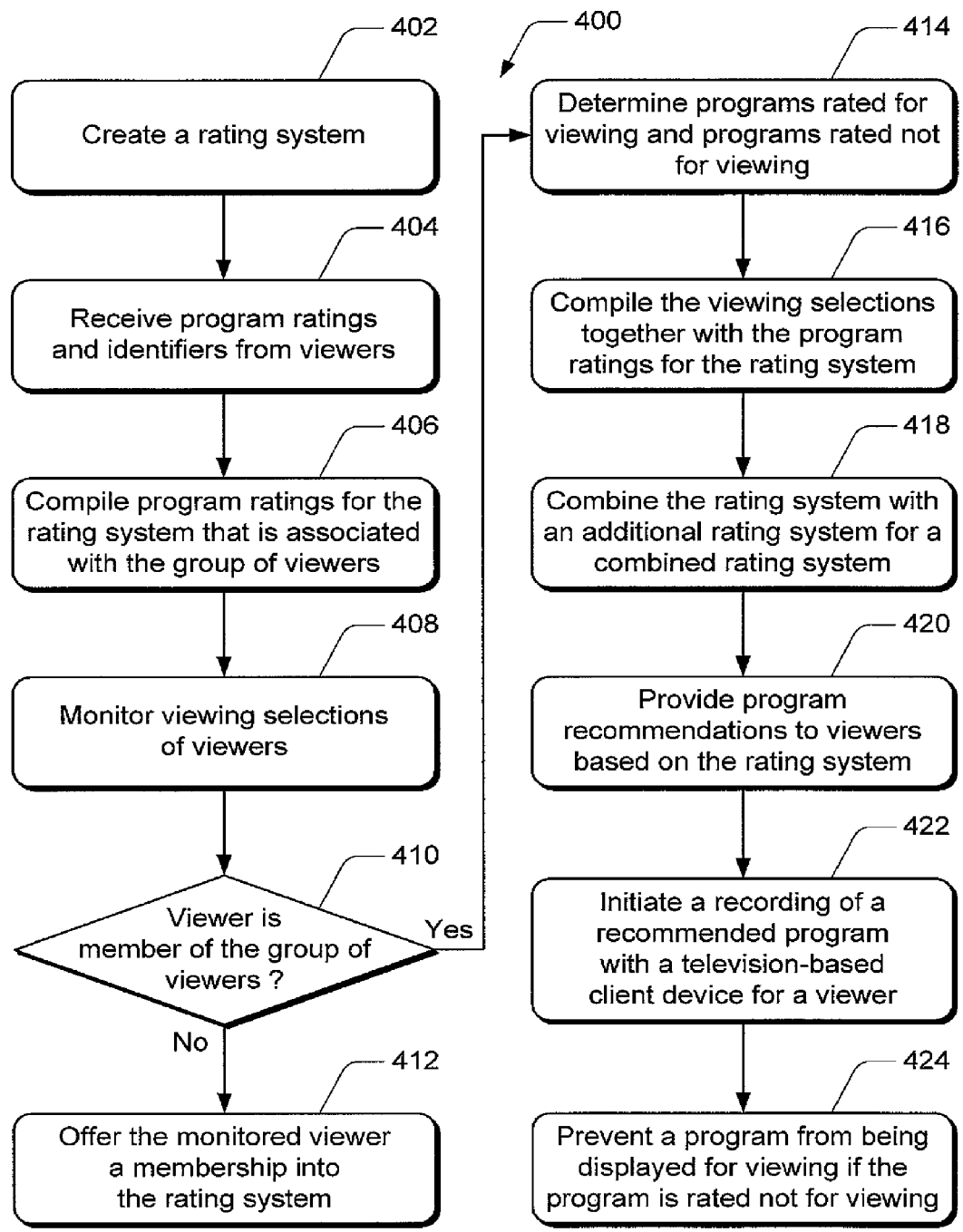
FIG. 4 illustrates exemplary method(s) for content ratings and recommendations.

FIG. 4 illustrates an exemplary method 400 for content ratings and recommendations and is described with reference to the exemplary content ratings and recommendations system 100 shown in FIG. 1, and with reference to the exemplary television-based system 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a rating system is created. For example, one or some of the viewers in the group of viewers 108 initiate having the rating system 102 created or established, and the viewers of the group establish the standards for the rating system. At block 404, program ratings and identifiers are received from viewers. For example, some viewers in the group 108 identify (or "tag") and rate the programs for the group of viewers. In an embodiment, the ratings and identifiers of the programs can be received via the Web site 114 that is associated with the rating system 102.

At block 406, the program ratings are compiled for the rating system that is associated with the group of viewers. For example, the ratings service 104 compiles the program ratings received from the viewers that are associated with the rating system 102. At block 408, viewing selections of viewers are monitored. For example, in one embodiment, the ratings service 104 monitors viewing selections at a television-based client device 110. The viewing selections of viewers in the group 108 can be monitored, as well as the viewing selections of viewers that are not in a group associated with the rating system 102.

At block 410, a determination is made as to whether a monitored viewer is a member of the group associated with the rating system. If the monitored viewer is not a member of the group associated with the rating system (i.e., "no" from block 410), then the viewer is offered a membership into the rating system based on the viewing selections of the viewer and the standards of the rating system at block 412. If the monitored viewer is a member of the group associated with the rating system (i.e., "yes" from block 410), then the method continues with additional, other optional, and/or alternate embodiments of content ratings and recommendations.

At block 414, programs that are rated for viewing and programs that are rated not for viewing are included in the rating system according to standards of the rating system. For example, the rating system 102 can be restrictive, as well as an inclusive and descriptive rating system that includes programs which are each rated for viewing by at least a viewer of the group 108 and based on descriptive aspects of a program. At block 416, the viewing selections are compiled together with the program ratings for the rating system.

At block 418, the rating system is combined with an additional rating system to create a combined rating system. For example, the ratings service 226 can combine additional program ratings from other ratings provider(s) 230 for the rating system 210. Additionally, the ratings service 226 can receive and combine other rating system(s) 232 with the rating system 210 to create a combined rating system that is unique to a viewer of the group.

At block 420, program recommendations are provided to the viewers of the group based on the rating system (or based on a combined rating system). For example, the recommendation service 106 provides programming recommendations to the viewers of the group 108 based on standards of the rating system 102. The recommendation service 106 can provide a program recommendation to a viewer of the group 108 via an email message, a mobile text message, and/or as a program guide selection.

At block 422, a recording of a recommended program is initiated with a television-based client device for a viewer of the group. For example, the recommendation service 106 can initiate a recording of a recommended program with a television-based client device 110 for a viewer of the group 108. At block 424, a program is prevented from being displayed for viewing if the program is rated not for viewing according to standards of the rating system. For example, the recommendation service 106 can prevent a program from being displayed for viewing if the program is rated not for viewing according to standards of the rating system 102.

Figure 5:
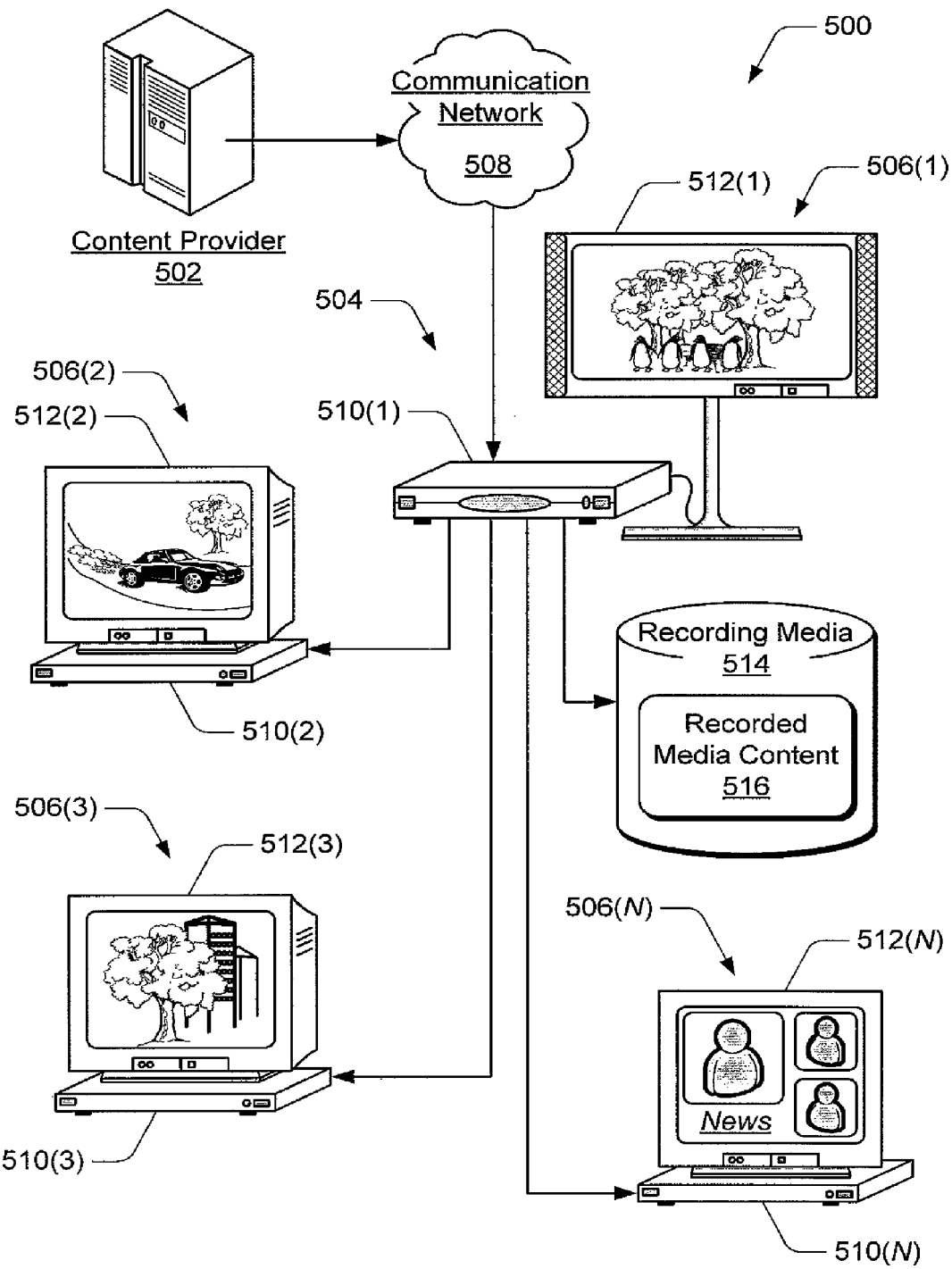
FIG. 5 illustrates an exemplary IP-based television (IPTV) system in which embodiments of content ratings and recommendations can be implemented.

FIG. 5 illustrates an exemplary IP-based television (IPTV) environment 500 in which embodiments of content ratings and recommendations can be implemented. The IPTV environment 500 includes a content provider 502 and a viewing system 504 that can include any number of television-based client systems 506. A client system 506(1) is configured for communication with the content provider 502 via a communication network 508 which, in this example, is an IP-based network. In addition to the client system 506(1), the viewing system 504 includes television-based client systems 506(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 506(1-N) may be implemented with any number and combination of differing components as further described below with reference to the exemplary client device 600 shown in FIG. 6. Further, the IPTV environment 500 may be implemented with any number and combination of differing components as described below with reference to the exemplary entertainment and information system 700 shown in FIG. 7.

The television-based client system 506(1) includes a client device 510(1) and a display device 512(1), such as any type of television, monitor, LCD, or similar television-based display system that renders audio, video, and/or image data. Similarly, the television-based client systems 506(2-N) each include a respective client device 510(2-N) and a respective display device 512(2-N). Each client device 510 can be implemented in any number of embodiments, such as a television-based set-top box, a digital video recorder (DVR) and playback system, an appliance device, a gaming system, and as any other type of client device that may be implemented in a television-based entertainment and information system.

Client device 510(1) receives program content from content provider 502 via the communication network 508. In the example viewing system 504, client device 510(1) is a master client device that receives one or more data streams from content provider 502 and then arbitrates stream allocation to distribute the data streams, one each, to one or more of the other satellite client devices 510(2-N). The satellite client devices 510(2-N) connect to the master client device 510(1) to receive a data stream for live television, delayed program viewing, and/or recorded DVR playback. The data streams are allocated by the content provider 502 to the viewing system 504 (e.g., a household), and the data streams can be any combination of high definition and/or standard definition television data streams. For example, the viewing system 504 may receive one high definition data stream and three standard definition data streams depending upon available bandwidth to deliver the data streams.

Although the data streams are not shown specifically, the arrowed communication links illustrate various data communication links which include the data streams. Additionally, the arrowed communication links are not intended to be interpreted as a one-way communication link from client device 510(1) to client device 510(2), for example. It is contemplated that any one or more of the arrowed communication links can facilitate two-way data communication, such as from client device 510(2) to client device 510(1) for example, and from client device 510(1) to content provider 502.

In this system, the master client device 510(1) receives four (4) data streams from the content provider 502 via the communication network 508. A viewing selection from a first data stream is shown for viewing on display device 512(1) at the television-based client system 506(1). A second data stream is directed from the master client device 510(1) to the television-based client system 506(2) and a viewing selection from a second data stream is shown for viewing on display device 512(2). Similarly, a third data stream is directed from the master client device 510(1) to the television-based client system 506(3) and a viewing selection from the third data stream is shown for viewing on display device 512(3). Additionally, a fourth data stream is directed from the master client device 510(1) to the television-based client system 506(4) and a viewing selection from the fourth data stream is shown for viewing on display device 512(4).

The viewing system 504 also includes recording media 514 which can be implemented as a DVR system to record and maintain media content 516, such as any form of programs, movies, and similar audio, video, and/or image content that may be distributed or otherwise received from content provider 502. In one embodiment, the recording media can be implemented as an independent component of the viewing system 504 and connected to the master client device 510(1). Alternatively, the recording media 514 can be implemented as a component of the master client device 510(1) which manages recordings initiated from any of the other satellite client devices 510(2-N). In yet another embodiment, the recording media 514 may be a distributed recording system where any one or more of the client devices 510(1-N) include recording media that is centrally managed by the master client device 510(1).

Figure 6:
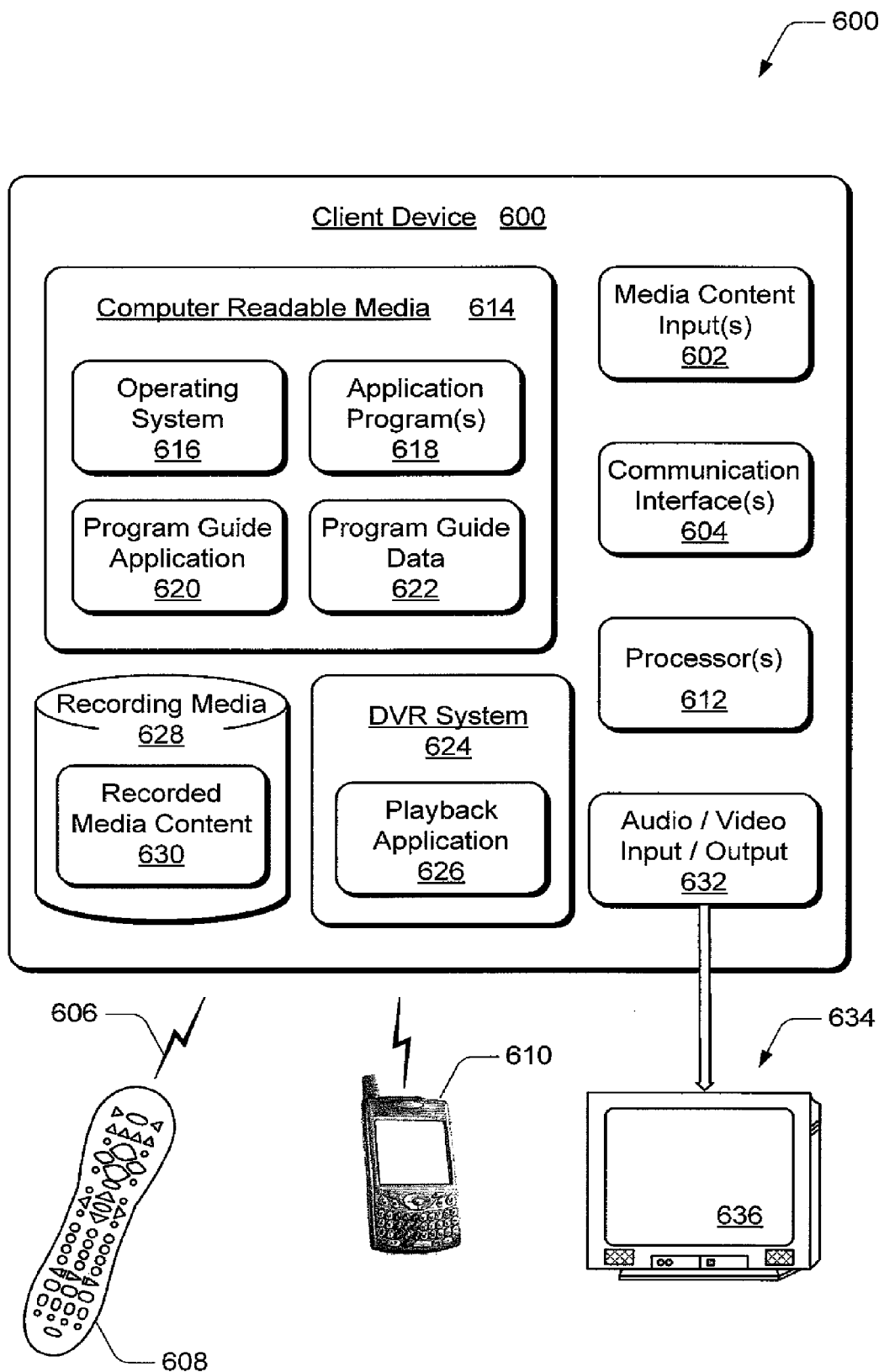
FIG. 6 illustrates various components of an exemplary client device in which embodiments of content ratings and recommendations can be implemented.

FIG. 6 illustrates various components of an exemplary client device 600 which can be implemented as any form of a computing, electronic, and/or television-based client device, and in which embodiments of content ratings and recommendations can be implemented. For example, the client device 600 can be implemented as a television-based client device 110 shown in FIG. 1, as the television-based client device 202 shown in FIG. 2, and/or as any one of the television-based client devices 510(1-N) shown in FIG. 5 as part of the viewing system 504.

Client device 600 includes one or more media content inputs 602 which may include Internet Protocol (IP) inputs over which streams of media content are received via an IP-based network. Device 600 further includes communication interface(s) 604 which can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between the client device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Client device 600 also includes one or more processors 612 (e.g., any of microprocessors, controllers, and the like) which process various computer executable instructions to control the operation of device 600, to communicate with other electronic and computing devices, and to implement embodiments of content ratings and recommendations. Client device 600 can be implemented with computer readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 614 provides data storage mechanisms to store various information and/or data such as software applications and any other types of information and data related to operational aspects of client device 600. For example, an operating system 616 and/or other application programs 618 can be maintained as software applications with the computer readable media 614 and executed on processor(s) 612 to implement embodiments of content ratings and recommendations.

For example, client device 600 can be implemented to include a program guide application 620 that is implemented to process program guide data 622 and generate program guides for display which enable a viewer to navigate through an onscreen display and locate broadcast programs, recorded programs, video on-demand programs and movies, interactive game selections, network-based applications, and other media access information or content of interest to the viewer. The application programs 618 can include a ratings service 104 or 226, and a recommendation service 106 or 228 to implement features and embodiments of content ratings and recommendations as described herein. Alternatively, a programmed application can be implemented as an integrated module or component of the program guide application 620 to implement embodiments of content ratings and recommendations. The client device 600 can also include a DVR system 624 with playback application 626, and recording media 628 to maintain recorded media content 630.

The client device 600 also includes an audio and/or video output 632 that provides audio and video to an audio rendering and/or display system 634, or to other devices that process, display, and/or otherwise render audio, video, and image data. Video signals and audio signals can be communicated from device 600 to a display device 636 via an RF (radio frequency) link, S-video link, composite video link, component video link, analog audio connection, or other similar communication link.

Figure 7:
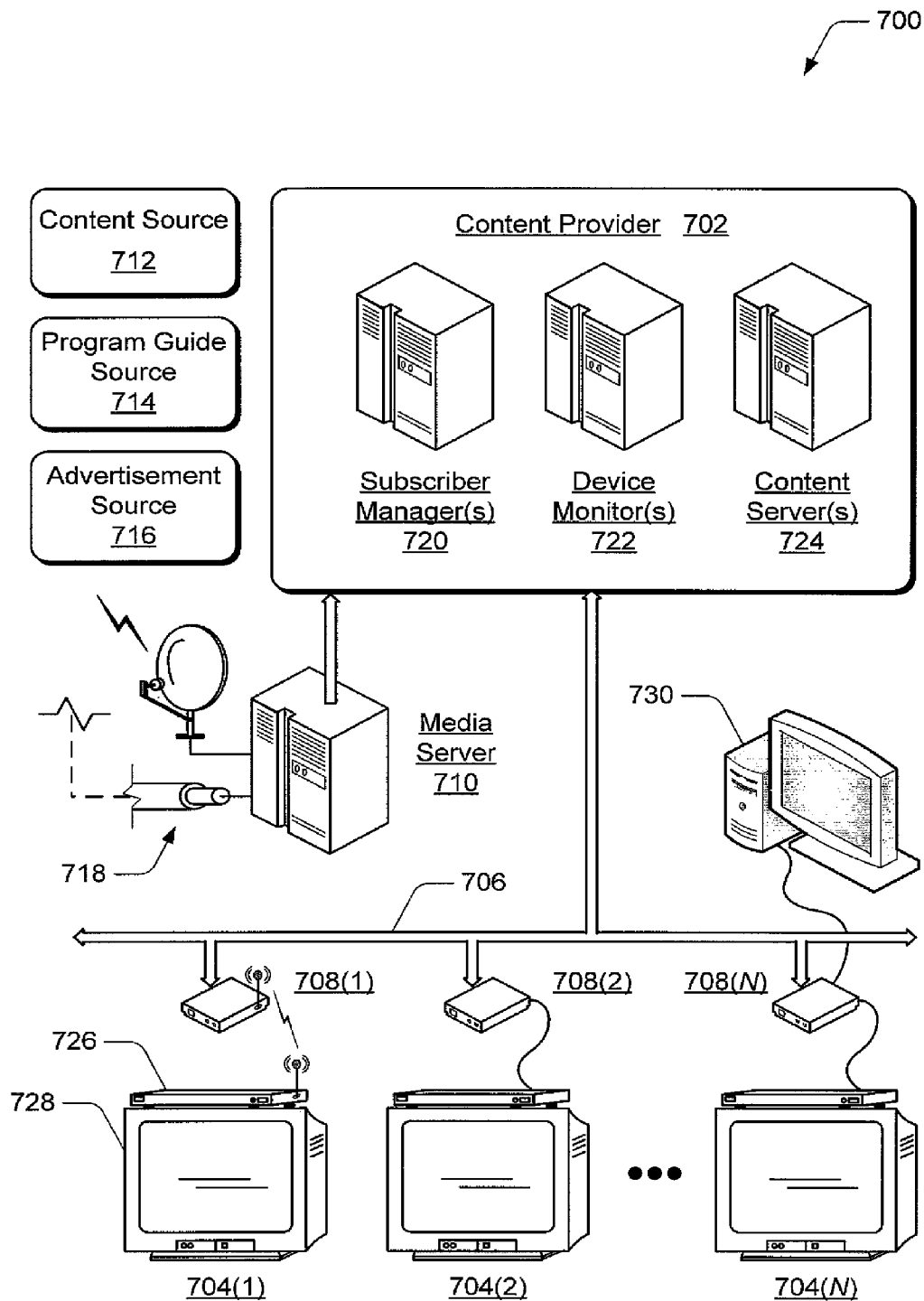
FIG. 7 illustrates various devices and components in an exemplary entertainment and information system in which embodiments of content ratings and recommendations can be implemented.

FIG. 7 illustrates an exemplary entertainment and information system 700 in which an IP-based television environment can be implemented, and in which embodiments of content ratings and recommendations can be implemented. System 700 facilitates the distribution of program content, program guide data, and advertising content to multiple viewers and to multiple viewing systems. System 700 includes a content provider 702 and television-based client systems 704(1-N) each configured for communication via an IP-based network 706. Each television-based client system 704(1-N) is an example of the television-based client system 506(1) described with reference to FIG. 5. Each of the television-based client systems 704(1-N) can receive one or more data streams from content provider 702 and then arbitrate stream allocation to distribute the data streams, one each, to one or more other satellite client devices in a viewing system.

The network 706 can be implemented as a wide area network (e.g., the Internet), an intranet, a Digital Subscriber Line (DSL) network infrastructure, or as a point-to-point coupling infrastructure. Additionally, network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content provider 702 and the client systems 704(1-N). The television-based client systems 704 (1-N) receive program content, program guide data, advertising content, closed captions data, and the like from content server(s) of the content provider 702 via the IP-based network 706.

System 700 includes a media server 710 that receives program content from a content source 712, program guide data from a program guide source 714, and advertising content from an advertisement source 716. In an embodiment, the media server 710 represents an acquisition server that receives the audio and video program content from content source 712, an EPG server that receives the program guide data from program guide source 714, and/or an advertising management server that receives the advertising content from the advertisement source 716.

The content source 712, the program guide source 714, and the advertisement source 716 control distribution of the program content, the program guide data, and the advertising content to the media server 710 and/or to other television-based servers. The program content, program guide data, and advertising content is distributed via various transmission media 718, such as satellite transmission, radio frequency transmission, cable transmission, and/or via any number of other wired or wireless transmission media. In this example, media server 710 is shown as an independent component of system 700 that communicates the program content, program guide data, and advertising content to content provider 702. In an alternate implementation, media server 710 can be implemented as a component of content provider 702.

Content provider 702 is representative of a headend service in a television-based content distribution system, for example, that provides the program content, program guide data, and advertising content to multiple subscribers (e.g., the television-based client systems 704(1-N)). The content provider 702 can be implemented as a satellite operator, a network television operator, a cable operator, and the like to control distribution of program and advertising content, such as movies, television programs, commercials, music, and other audio, video, and/or image content to the client systems 704(1-N).

Content provider 702 includes various components to facilitate media data processing and content distribution, such as a subscriber manager 720, a device monitor 722, and a content server 724. The subscriber manager 720 manages subscriber data, and the device monitor 722 monitors the client systems 704(1-N) (e.g., and the subscribers), and maintains monitored client state information.

Although the various managers, servers, and monitors of content provider 702 (to include the media server 710 in one embodiment) are illustrated and described as distributed, independent components of content provider 702, any one or more of the managers, servers, and monitors can be implemented together as a multi-functional component of content provider 702. Additionally, any one or more of the managers, servers, and monitors described with reference to system 700 can implement features and embodiments of content ratings and recommendations.

The television-based client systems 704(1-N) can be implemented to include a client device 726 and a display device 728 (e.g., a television). A client device 726 of a television-based client system 704 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 704(N) is implemented with a computing device 730 as well as a client device 726. Additionally, any of the client devices 726 of a client system 704 can implement features and embodiments of content ratings and recommendations as described herein.

Although embodiments of content ratings and recommendations have been described in language specific to structural features and/or methods, it is to be understood that the subject of the appended claims is not necessarily limited to the specific features or methods described. Rather, the specific features and methods are disclosed as exemplary implementations of content ratings and recommendations.

The invention claimed is:

1. A content ratings and recommendation system implemented using a computer-readable medium, comprising:
    a ratings service configured to compile ratings of programs for a rating system that is associated with a group of viewers where at least one viewer of the group of viewers establishes the rating system including at least one standard of the rating system, and where at least some viewers of the group of viewers use the rating system to rate the programs for the group of viewers, wherein the rating system represents flexible characterization of the media content of the programs based on at least one of any possible descriptive aspect of the program;
    a recommendation service configured to provide program recommendations to the viewers of the group of viewers based on the rating system, the recommendation further being configured to monitor viewing selections of a viewer that is not a member of the group of viewers, and to offer a membership into the rating system to the viewer based on the viewing selections of the viewer and the at least one standard of the rating system; and
    a rater monitoring service configured to receive a rating of a particular viewer who used the rating system to rate a particular program and to provide the rating of the particular viewer to the viewers of the group of viewers, the rating of the particular viewer relating to a reliability or credibility of the ratings made by the particular viewer.

2. A content ratings and recommendation system as recited in claim 1, further comprising a Web site associated with the rating system such that at least some of the viewers of the group of viewers cooperate to rate the programs for the group of viewers via the Web site.

3. A content ratings and recommendation system as recited in claim 1, wherein the rating system includes both a first group of programs that are rated for viewing and a second group of programs that are rated not for viewing according to the at least one standard of the rating system.

4. A content ratings and recommendation system as recited in claim 1, wherein the rating system includes both a first group of programs that are rated for viewing and a second group of programs that are rated not for viewing according to at least one standard of the rating system, and wherein at least some of the viewers of the group of viewers establish the at least one standard of the rating system.

5. A content ratings and recommendation system as recited in claim 1, wherein the rating system is an inclusive and descriptive rating system that includes a first group of programs which are each rated for viewing by at least a viewer of the group of viewers and based on descriptive aspects of each respective program.

6. A content ratings and recommendation system as recited in claim 1, wherein the ratings service is further configured to compile additional ratings of the programs from one or more additional rating systems such that the rating system includes the additional ratings of the programs along with the ratings of the programs which are provided by at least some of the viewers of the group of viewers.

7. A content ratings and recommendation system as recited in claim 1, wherein the ratings service is further configured to compile viewing selections of at least some of the viewers of the group of viewers such that the rating system includes the ratings of the programs and the viewing selections that comport with the at least one standard of the rating system.

8. A content ratings and recommendation system as recited in claim 1, wherein the ratings service is further configured to receive a rating of a program from a viewer of the group of viewers while the viewer is watching the program.

9. A content ratings and recommendation system as recited in claim 1, wherein the recommendation service is further configured to provide a program recommendation to a viewer of the group of viewers via at least one of an email message, a mobile text message, or a program guide selection.

10. A content ratings and recommendation system as recited in claim 1, wherein the recommendation service is further configured to initiate a recording of a recommended program with a television based client device for a viewer of the group of viewers.

11. A content ratings and recommendation system as recited in claim 1, wherein the recommendation service is further configured to prevent a program from being displayed for viewing if the program is rated not for viewing according to the at least one standard of the rating system.

12. A content ratings and recommendation system as recited in claim 1, wherein the rating system comprises a hierarchy of rankings.

13. A content ratings and recommendation system as recited in claim 1,
    wherein at least one or more of the possible descriptive aspects of the programs comprise characteristics of the programs relevant to the group of viewers.

14. A content ratings and recommendation system as recited in claim 1, wherein the rating system uses a custom scale system for rating the programs.

15. A method implemented using a processor, comprising:
    allowing a user to establish a rating system including at least one standard of the rating system, wherein the rating system represents flexible characterization of the media content of the programs based on at least one of any possible descriptive aspect of the programs;
    receiving ratings of programs from at least some viewers of a group of viewers that rate the programs for the group of viewers;
    compiling the ratings of the programs for the rating system that is associated with the group of viewers;
    rating each of the viewers that has rated one more programs based on a reliability and credibility of the program ratings;
    providing program recommendations to the viewers of the group of viewers based on the rating system;
    monitoring viewing selections of a viewer that is not a member of the group of viewers; and
    offering a membership into the rating system to the viewer based on the viewing selections of the viewer and the at least one standard of the rating system.

16. A method as recited in claim 15, further comprising:
    combining the rating system with at least one additional rating system to create a combined rating system that is unique to a viewer of the group of viewers; and
    providing additional program recommendations to the viewer of the group of viewers based on the combined rating system.

17. A method as recited in claim 15, further comprising determining both a first group of programs that are rated for viewing and a second group of programs that are rated not for viewing to be included in the rating system according to the at least one standard of the rating system that are established by at least some of the viewers of the group of viewers.

18. A method as recited in claim 15, further comprising:
    monitoring viewing selections of at least some of the viewers of the group of viewers; and
    compiling the viewing selections together with the ratings of the programs for the rating system.

19. A method as recited in claim 15, wherein providing the program recommendations include providing a program recommendation to a viewer of the group of viewers via at least one of an email message, a mobile text message, or a program guide selection.

20. A method as recited in claim 15, further comprising initiating a recording of a recommended program with a television based client device for a viewer of the group of viewers.

21. A method as recited in claim 15, further comprising preventing a program from being displayed for viewing if the program is rated not for viewing according to the at least one standard of the rating system.

22. A method as recited in claim 15, wherein the rating system comprises a hierarchy of rankings.

23. A method as recited in claim 15,
wherein at least one or more of the possible descriptive aspects of the programs comprise characteristics of the programs relevant to the group of viewers.

24. A method as recited in claim 15, wherein the establishing the rating system comprises establishing custom scaling for rating the programs.

25. A system comprising:
a ratings service being configured to enable a rater to establish a rating system for a particular piece of content including establishing a standard by a rater and according to which the particular content will be rated;
the rating system being further configured to accept ratings of the particular content according to the standard and from a plurality of raters after the establishment of the rating system by the rater;
a rater service being configured to monitor the ratings of the particular content made by the plurality of raters to provide a rating for each of the plurality of raters based on a credibility or a reliability the ratings; and
a recommendation service being configured to provide content recommendations based on ratings of content including ratings of the particular content against the standard and the ratings of the plurality of raters, wherein at least a portion of the system is implemented in hardware, the recommendation further being configured to monitor viewing selections of a particular rater that is not a member of the plurality of raters, and offer a membership into the rating system to the particular rater based on the viewing selections of the particular rater and the standard of the rating system.

26. A system as recited in claim 25, wherein after the rating system is established the rating system accepts an initial rating from a rater.

* * * * *